United States Patent [19]

Netzer et al.

[11] Patent Number: 5,189,913
[45] Date of Patent: Mar. 2, 1993

[54] APPARATUS AND METHOD FOR DETERMINING THE RATE OF ROTATION OF A MOVING BODY

[75] Inventors: Ehud Netzer, Migdal-Haemek; Itzhak Porat, Haifa, both of Israel

[73] Assignee: The State of Israel, Ministry of Defence, Rafael Armament Development Authority, Tel Aviv, Israel

[21] Appl. No.: 778,255

[22] Filed: Oct. 17, 1991

Related U.S. Application Data

[63] Continuation-in-part of Ser. No. 479,972, Feb. 14, 1990, abandoned.

[30] Foreign Application Priority Data

Mar. 14, 1989 [IL] Israel .................................... 89605

[51] Int. Cl.$^5$ ............................................. G01P 9/04
[52] U.S. Cl. .................................................. 73/505
[58] Field of Search ................................. 73/505, 518

[56] References Cited

U.S. PATENT DOCUMENTS 4,884,446 12/1989 Ljung ..................................... 73/505
4,930,351 6/1990 Macy et al. ............................ 73/505

Primary Examiner—John E. Chapman
Attorney, Agent, or Firm—Helegott & Karas

[57] ABSTRACT

An apparatus and method for determining the rate of rotation of a body rotating with an angular velocity $\omega$ about a first axis. The apparatus comprises a housing adapted to be fixed to the body so as to rotate with the angular velocity $\omega$ about the first axis and a mechanical system within the housing having more than two degrees of freedom. Electromagnetic drive coils are provided for applying a forced vibration to the mechanical system about a second axis substantially perpendicular to the first axis, thereby producing a Coriolis response along a third axis mutually perpendicular to the first and second axes, the forced vibration having a predetermined magnitude and a frequency which is constrained to lie within a predetermined range such that there is produced a coupling between the degrees of freedom whereby the magnitude of the Coriolis response is substantially insensitive to frequency. The magnitude of the Coriolis response is measured and a computing device responsive to the magnitude of the forced vibration and to the magnitude of the Coriolis response calculates the rate of rotation $\omega$. In a preferred embodiment, the mechanical system has four degrees of freedom and comprises an inertial beam having a couple of concentrated masses or an inertial mass element coupled thereto.

4 Claims, 6 Drawing Sheets

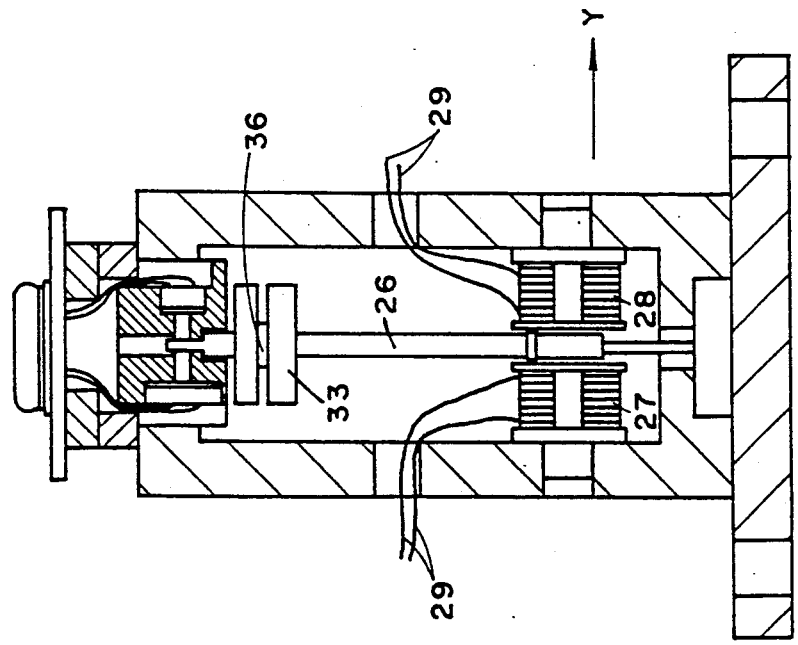
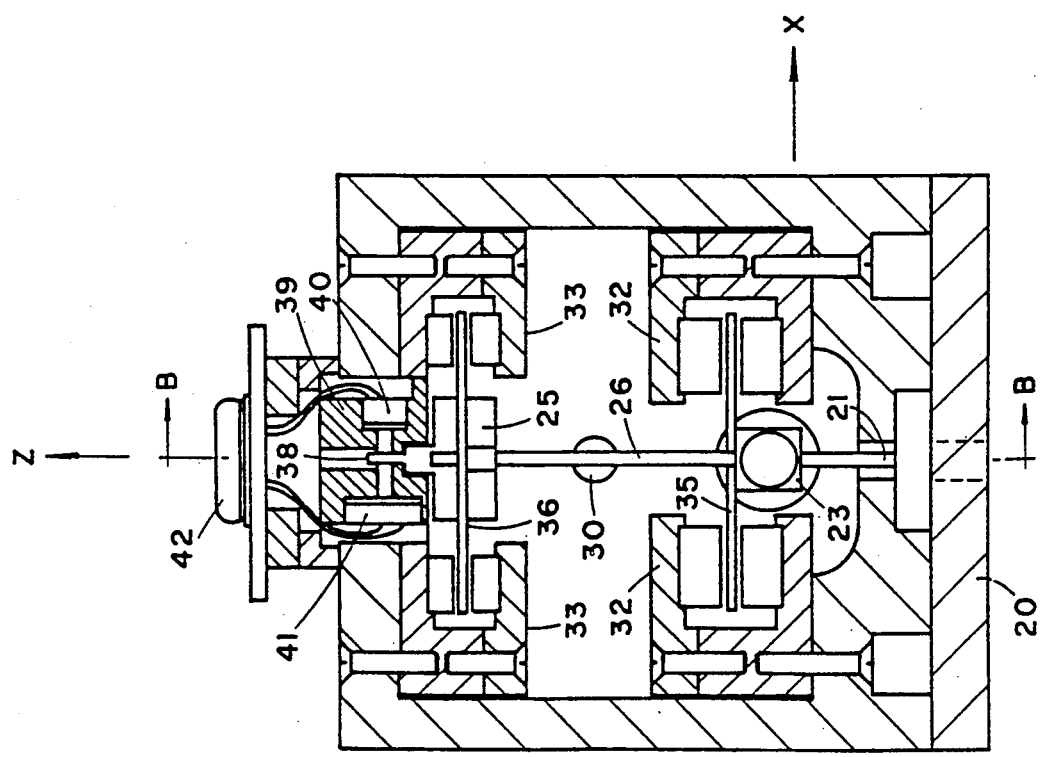

APPARATUS AND METHOD FOR DETERMINING THE RATE OF ROTATION OF A MOVING BODY

RELATED APPLICATION

This is a continuation-in-part of application Ser. No. 479,972 filed on Feb. 14, 1990 and now abandoned.

FIELD OF THE INVENTION

This invention relates to an apparatus and method for determining the rate of rotation of a moving body.

BACKGROUND OF THE INVENTION

It is often required to determine the rate of rotation of a moving body using apparatus which is both highly accurate as well as being sensitive to the measured parameter whilst being relatively insensitive to other influences.

It is known to employ gyroscopes for the determination of rate of rotation. The use of a gyroscope for such measurement resides in the principle of spinning a symmetrical rotor at very high speed about its axis of symmetry. Consequently, there will exist a very high angular momentum about this axis and, according to Law of Conservation of Angular Momentum, the angular momentum of the rotor about the spinning axis will tend to be conserved in the event of an external rotation applied to the gyroscope.

Thus, as an external rotation is applied to the gyroscope, a compensating moment is applied thereto whose magnitude is a function of the applied rate of spin. In reality, angular momentum is not exactly conserved on account of frictional and other losses. Therefore, in order to achieve good results, frictional losses must be minimized and the angular momentum of the rotor should be made as large as possible. Therefore, in order for gyroscopes to be sufficiently sensitive, it is necessary for a relatively massive rotor to be spun within substantially frictionless bearings at a very high rate of spin.

Such systems are inherently expensive and subject the bearings to very high forces. This, in turn, imposes a relatively short lifespan on the gyroscope.

Consequently, in spite of the popularity of the gyroscope for measuring rates of rotation, there have been moves in recent years to employ the Coriolis effect in so-called "non-gyroscopic" inertia measuring devices. The principle of the Coriolis effect is that when a body moves linearly in a specified direction whilst, at the same time, being subjected to a rotation about an axis perpendicular to the direction of linear motion, then the linear and angular velocities combine vectorially to produce a force which is applied to the body in a direction which is mutually perpendicular both to the spin axis and the direction of linear motion. The magnitude of the resultant force, called the Coriolis force, is a function of the rate of rotation at which the body rotates and may therefore be used as a basis for its determination. Thus, if:

$\vec{\omega}$ = the angular velocity vector of the body,
$\vec{V}$ = the linear velocity vector of the body,
m = the mass of the body, and
$\vec{F}_c$ = the magnitude of the Coriolis force, then $$\vec{F}_c = 2m\vec{\omega} \times v \qquad (1)$$

where $\vec{\omega} \times \vec{V}$ is the vector cross product of the vectors $\vec{\omega}$ and $\vec{V}$.

The Gyrotron utilizes this phenomenon by employing a tuning-fork type of element rotated about its longitudinal axis. The tines of the fork are subjected to a forced high frequency oscillation by means of a pair of electromagnetic drive coils. Since the forced oscillation is perpendicular to the axis of rotation of the fork, a Coriolis force will be generated along a mutually perpendicular, transverse axis, the magnitude of which force is detected by means of a pair of electromagnetic pick-up coils. Determination of the Coriolis response may be used to determine the rate of rotation of the fork about its longitudinal axis.

The basic principle of the Gyrotron described above has been exploited in many prior art devices for determining rate of rotation. For example, British Published Patent Specification No. 2 154 739 discloses a gyroscopic device having a disc-shaped piezo-electric resonator along a surface of which are provided a plurality of exciting electrodes interspersed with a like plurality of detecting electrodes. When the piezoelectric resonator is spun about its longitudinal axis and a sinusoidal exciting voltage is applied to the exciting electrodes, there is generated, in accordance with the Coriolis principle described above, a voltage signal at the detecting electrodes which are disposed 90° out of phase with the exciting electrodes. On account of the rotation of the disc, there exists a phase shift in the electrical output from the detecting electrodes and this phase shift is employed within a feedback loop in order to null the voltage difference between the electrical output of the two pairs of detecting electrodes. Under these circumstances, the voltage derived across one pair of the detecting electrodes provides a direct measure of the angular velocity $\omega$ of the rotating disc.

U.S. Pat. No. 3,839,915 discloses a turn rate sensor of the vibratory tuning fork type, as described above with respect to the Gyrotron. In such an arrangement, a rotation about an axis parallel to the tines of the fork in combination with forced vibration of the tines themselves, gives rise to a Coriolis force along a mutually perpendicular transverse axis. The system further provides for the compensation of asymmetry of the tuning fork and misalignment of the tine motions, so as to minimize errors.

Likewise, in U.S. Pat. No. 4,930,351 (Macy et al.) there is disclosed a "Tuning Fork" type angular rate sensor operating in accordance with the principles of the Gyrotron described above. Macy et al. disclose a multi-sensor comprising two parts. The arrangement shown in FIG. 1 thereof serves to measure displacements of the tuning fork tines each of which is analogous to a single degree of freedom system. The sensing is based on two beams permitting accelerating sensing owing to the axial movement which results from out-of-plane asymmetrical deflection of the beams caused by one of the beams being provided with a thin, flexible portion so as to render it asymmetric.

U.S. Pat. No. 4,884,446 (Ljung) discloses a force balance wherein a proof mass is restrained within the X-Y plane. The proof masses are balanced longitudinally and their centers of gravity are located such that the latter do not move when the proof masses are angularly vibrated. Consequently, there is no coupling between the translational and angular vibrations of the proof masses. The translational vibration having a spring constant $k_1 = 12EIl^{-3}$ serves to isolate beam vibration. Angular rate sensing is based on the angular forced vibration of the inertias with the angular spring constant $k_2 = EII^{-1}$ about the center of mass of each inertia in the mode of a simple one degree of freedom angular vibration.

Furthermore, the system disclosed by Ljung is a first order resonant system configured to have a high Q-value resulting from the absence of damping gas and nodal suspensions. The high Q-value is also due to the minimization of energy losses resulting from the fact that the ends of the inertia members are attached to the beam ends such that the entire beam length is evenly flexurally stressed with the inertia members vibrating about their centers of gravity.

As is known, first order resonant systems are highly sensitive when operating at the resonant frequency, but suffer from the major drawback that any small deviation from the resonant frequency results in a marked decrease in operational sensitivity.

This drawback is associated with all the systems described above which are first order mechanical resonant systems having two degrees of freedom. Thus, if the three mutually perpendicular Cartesian axes are considered, the systems rotate about the vertical z-axis and it is the rate of rotation about this axis which is to be determined. A forced vibration is applied along the transverse y-axis giving rise to a Coriolis response along the transverse x-axis. In the particular case wherein the magnitude of the forced vibration along the y-axis is constrained to be constant, one of the degrees of freedom is lost and the resulting system has one degree of freedom only. However, since the basic, unconstrained system has two degrees of freedom, it will be referred to in hereinafter as a two degree of freedom system.

It may be shown that for such mechanically resonant systems having two degrees of freedom and wherein:
$\omega_z$ = rate of rotation about the z-axis,
$y_0$ = amplitude of forced periodic vibration,
$\Omega$ = the frequency of the forced periodic vibration, and
$\xi$ = damping ratio
then, the response in the direction of the x-axis due to the Coriolis effect is given by:

$$X = \frac{\omega_z y_0}{\xi \Omega} \cos \Omega t \quad (2)$$

Several drawbacks associated with prior art constructions become clear on an analysis of the complete system. Thus, the response X is highly sensitive to the resonant frequency $\omega_n$. It may be shown that if the damping ratio, $\xi$, equals 0.02 and the frequency $\Omega$ of the forced periodic vibration is only 1% less than the resonant frequency $\omega_n$, then the magnitude of the response X falls by as much as 20%.

There thus exists a conflict between the desire, on the one hand, to raise the gain (i.e. the magnitude of X) and, on the other hand, to be insensitive to the fixed parameters of the mechanical system.

Furthermore, if the mass rotates sinusoidally according to the equation:

$$\omega_z = \omega_{z0} \cos \lambda t \quad (3)$$

then the bandwidth of the system is given by:

$$\lambda_{B.W.} = \xi \Omega \quad (4)$$

Thus, to increase the bandwidth of $\lambda$ the product $\xi \Omega$ must be increased. However, it will be seen from equation (2) above that increasing the product $\xi \Omega$ decreases the magnitude of the response X. In other words, by increasing the bandwidth, the sensitivity is lowered.

In addition to the drawbacks with respect to the frequency response of first order systems having a single degree of freedom, as described above, there are additional problems associated with coupling between the forced vibration and the response, owing to the nature of the system.

In conclusion, there exists an inherent problem in employing the model disclosed in the prior art having a single degree of freedom, since such systems are highly sensitive to the accuracy at which the frequency $\Omega$ of the forced vibration approximates the resonant frequency $\omega_n$ of the system. To maximize the gain, the mass must be vibrated at the natural frequency, i.e. $\Omega = \omega_n$. If, however, for any reason there is even a small discrepancy between $\Omega$ and $\omega_n$, then the gain drops drastically.

SUMMARY OF THE INVENTION

It is an object of the invention to provide an apparatus and method for determining the rate of rotation of a body, in which the drawbacks associated with hitherto proposed systems are substantially reduced or eliminated.

According to one aspect of the invention there is provided an apparatus for determining the rate of rotation of a body rotating with an angular velocity $\omega$ about a first axis, the apparatus comprising:

a housing adapted to be fixed to said body so as to rotate with said angular velocity $\omega$ about the first axis;

a mechanical system within the housing having more than two degrees of freedom;

forcing means for applying a forced vibration to the mechanical system about a second axis substantially perpendicular to said first axis, thereby producing a Coriolis response along a third axis mutually perpendicular to said first and second axes, said forced vibration having a predetermined magnitude and a frequency which is constrained to lie within a predetermined range such that there is produced a coupling between said degrees of freedom whereby the magnitude of the Coriolis response is substantially insensitive to frequency;

measuring means for measuring the magnitude of the Coriolis response; and computing means responsive to the magnitude of the forced vibration and to the magnitude of the Coriolis response for calculating the rate of rotation $\omega$.

According to another aspect of the invention there is provided a method for determining the rate of rotation of a body rotating with an angular velocity $\omega$ about a first axis, the method comprising the steps of:

rotating a mechanical system having more than two degrees of freedom about said first axis at said angular velocity $\omega$, applying a forced vibration to said mechanical system about a second axis substantially perpendicular to the first axis, said forced vibration having a magnitude and a frequency which is constrained to lie within a predetermined range such that there is produced a coupling between said degrees of freedom so as to produce a Coriolis response along a third axis mutually perpendicular to said first and second axes whose magnitude is substantially insensitive to said frequency, measuring the magnitude of the Coriolis response, and computing the rate of rotation ω as a function of the magnitude of the forced vibration and of the magnitude of the Coriolis response.

Thus, in accordance with the invention a mechanical resonant system is employed having more than two degrees of freedom. By considering the frequency response for such a system, it may be shown that there exists an operating range wherein an acceptably high gain may be achieved even when the frequency $\Omega$ of the forced vibration is substantially different to the natural frequency $\omega_n$ of the resonant system. Furthermore, the gain of the system is substantially insensitive to the operating frequency $\Omega$. It is thus possible to avoid the major drawbacks of hitherto proposed systems.

BRIEF DESCRIPTION OF THE DRAWINGS

The invention will now be described, by way of non-limiting example only, with regard to an apparatus and method for determining the rate of rotation of a body and with regard to the accompanying drawings, in which:

FIGS. 6(a) and (b) shows a practical implementation of the first embodiment according to the invention.

DETAILED DESCRIPTION OF A PREFERRED EMBODIMENT

Figure 1:
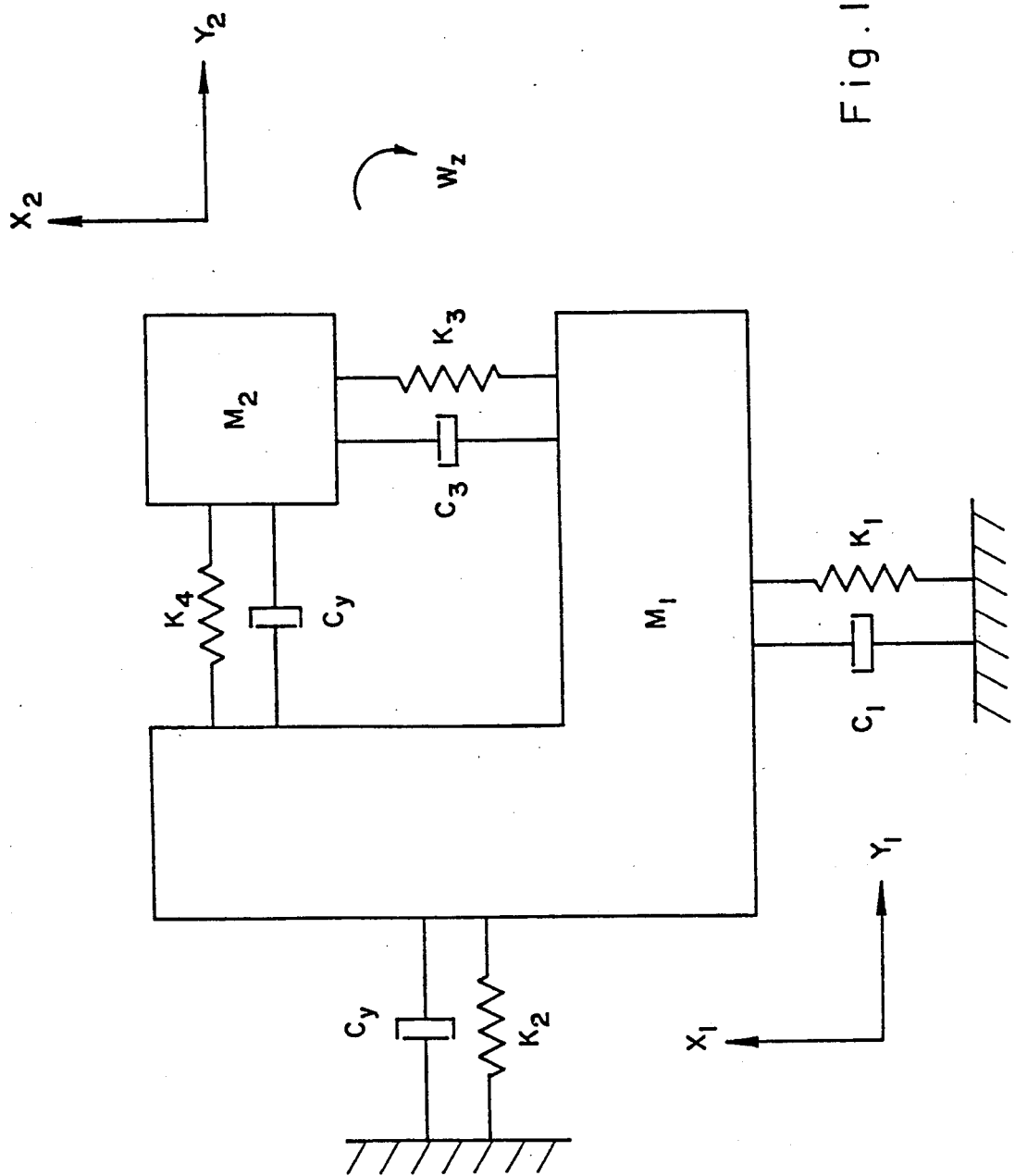
FIG. 1 shows schematically a mathematical model of a four degree of freedom mechanical system according to the invention useful for explaining the mathematical principles on which the invention is based.

Referring to FIG. 1 there is shown a mass $m_1$ constrained to move in a Cartesian frame $x_1 - y_1$. Thus, the mass $m_1$ is capable of vertical translation along the axis $x_1$ and of horizontal displacement along the axis $y_1$. The Cartesian frame $x_1 - y_1$ is itself subject to a rotational displacement with an angular velocity $\omega_z$ about an axis z (into the paper). The mass $m_1$ is fixed to the Cartesian frame $x_1 - y_1$ by springs having spring-coefficients $K_1$ and $K_2$ and by dampers having damping coefficients $C_1$ and $C_y$ connected in parallel with the corresponding springs. Coupled to the mass $m_1$ is a second mass $m_2$ adapted for movement within a second Cartesian frame defined by axes $x_2$, $y_2$ and z as shown in the figure. The mass $m_2$ is coupled to the mass $m_1$ by means of springs having spring coefficients $K_3$ and $K_4$ and by dampers having damping coefficients $C_3$ and $C_y$ in parallel with the respective springs. Throughout the following analysis it will be assumed that the damping coefficient $C_y$ is negligible (i.e. is zero). Additionally, the analysis will be simplified by assuming that the model is planar such that translation of the masses $m_1$ and $m_2$ along the z-axis as well as rotation of the masses $m_1$ and $m_2$ about the x- and y-axes is negligible (i.e. is zero).

Then, putting:

$$m_2 = m\, m_1, \quad c_3 = c\, c_1 \qquad (5)$$
$$K_2 = R_2 K_1, \quad K_3 = R_3 K_1, \quad K_4 = R_4 K_1$$
$$\omega_n^2 = \frac{K_1}{m_1}, \quad 2\omega_n \frac{\xi}{m_1} = c_1$$

and applying a forced vibration given by:

$$y_1 = y_0 \cos \Omega t \qquad (6)$$
$$\dot{y}_1 = -y_0 \Omega \sin \Omega t$$

then, simplified equations of motion for the resulting model are as follows:

$$\ddot{x}_1 + x_1(\omega_n^2 - \omega_z^2) + \omega_n^2 R_3(x_1 - x_2) + 2\omega_n \xi \dot{x}_1 + \qquad (7)$$
$$2c\omega_n \xi(\dot{x}_1 - \dot{x}_2) = -2\omega_z y_0 \Omega \sin(\Omega t) + \omega_z y_0 \cos(\Omega t)$$
$$m(\ddot{x}_2 - x_2\omega_z^2) + R_3 \omega_n^2(x_2 - x_1) +$$
$$2c\omega_n \xi(\dot{x}_2 - \dot{x}_1) - 2m\omega_z \dot{y}_2 - m\dot{\omega}_z y_2 = 0$$
$$m(\ddot{y}_2 - y_2 \omega_z^2) + R_4 \omega_n^2 y_2 + 2m\omega_z \dot{x}_2 + m\dot{\omega}_z x_2 =$$
$$R_4 \omega_n^2 y_0 \cos(\Omega t)$$

Assuming that the rate of rotation about the z-axis is constant, then:

$$\omega_z = \text{constant, and} \qquad (8)$$
$$\dot{\omega}_z = 0$$

Substituting (8) into (7):

$$\ddot{x}_1 - x_1 \omega_z^2 + x_1 \omega_n^2 + \omega_n^2 R_3(x_1 - x_2) + 2\omega_n \xi \dot{x}_1 + \qquad (9)$$
$$2c\omega_n \xi(\dot{x}_1 - \dot{x}_2) = \omega_z y_0 \Omega i (e^{i\Omega t} - e^{-i\Omega t})$$
$$m(\ddot{x}_2 - x_2 \omega_z^2) + R_3 \omega_n^2(x_2 - x_1) +$$
$$2c\omega_n \xi(\dot{x}_2 - \dot{x}_1) - 2m\omega_z \dot{y}_2 = 0$$
$$m(\ddot{y}_2 - y_2 \omega_z^2) + R_4 \omega_n^2 y_2 + 2m\omega_z \dot{x}_2 =$$
$$\tfrac{1}{2} R_4 \omega_n^2 y_0 (e^{i\Omega t} - e^{-i\Omega t})$$

Using the notation that:

$$A = \frac{\Omega}{\omega_n} \text{ and } \alpha = \frac{\omega_z}{\omega_n} \qquad (10)$$

and assuming that $\alpha^2 < 1$, the solution to equations (7) may be shown to be of the form:

$$\left( \begin{array}{c|c} a_{11} + ib_{11} & a_{12} + ib_{12} \\ \hline a_{21} + ib_{21} & a_{22} + ib_{22} \end{array} \right) \left( \begin{array}{c} x_{11} \\ x_{21} \end{array} \right) = \left( \begin{array}{c} ic_1 \\ ic_2 \end{array} \right) \frac{\alpha y_0}{\xi} \qquad (11)$$

where $c_1$ and $c_2$ are constants whose values depend on the properties of the system.

From a complete analysis of the above mathematics, it may be shown that the solutions to equations (6) are of the form:

$$\frac{x_1}{N} = 2\sqrt{g^2 + d^2} \cos(\Omega t + \rho_1) \quad \rho_1 = \tan^{-1}\left(\frac{d}{g}\right) \qquad (12)$$
$$\frac{x_2}{N} = 2\sqrt{n^2 + u^2} \cos(\Omega t + \rho_2) \quad \rho_2 = \tan^{-1}\left(\frac{u}{n}\right)$$

where N, $y_0$, $\xi$ and g, d, n and u are constants depending on the properties of the system. In particular, it should be noted that equation (12) is normalized with respect to N which is the gain for a two degree of freedom system, given by:

$$N = \frac{ay_0}{\xi} \quad (13)$$

It may be shown that for a two degree of freedom system, such as is employed in hitherto proposed systems, one of the sources of error is variations in the frequency of the first vibration. In order to examine the influence of this in the present model, it is necessary to calculate the response for changes in the frequency of the forced vibration. It may also be shown that the response $X_2$ is an order of magnitude greater than the response $X_1$ such that only the response $X_2$ need be related to in the following discussion.

Figure 2:
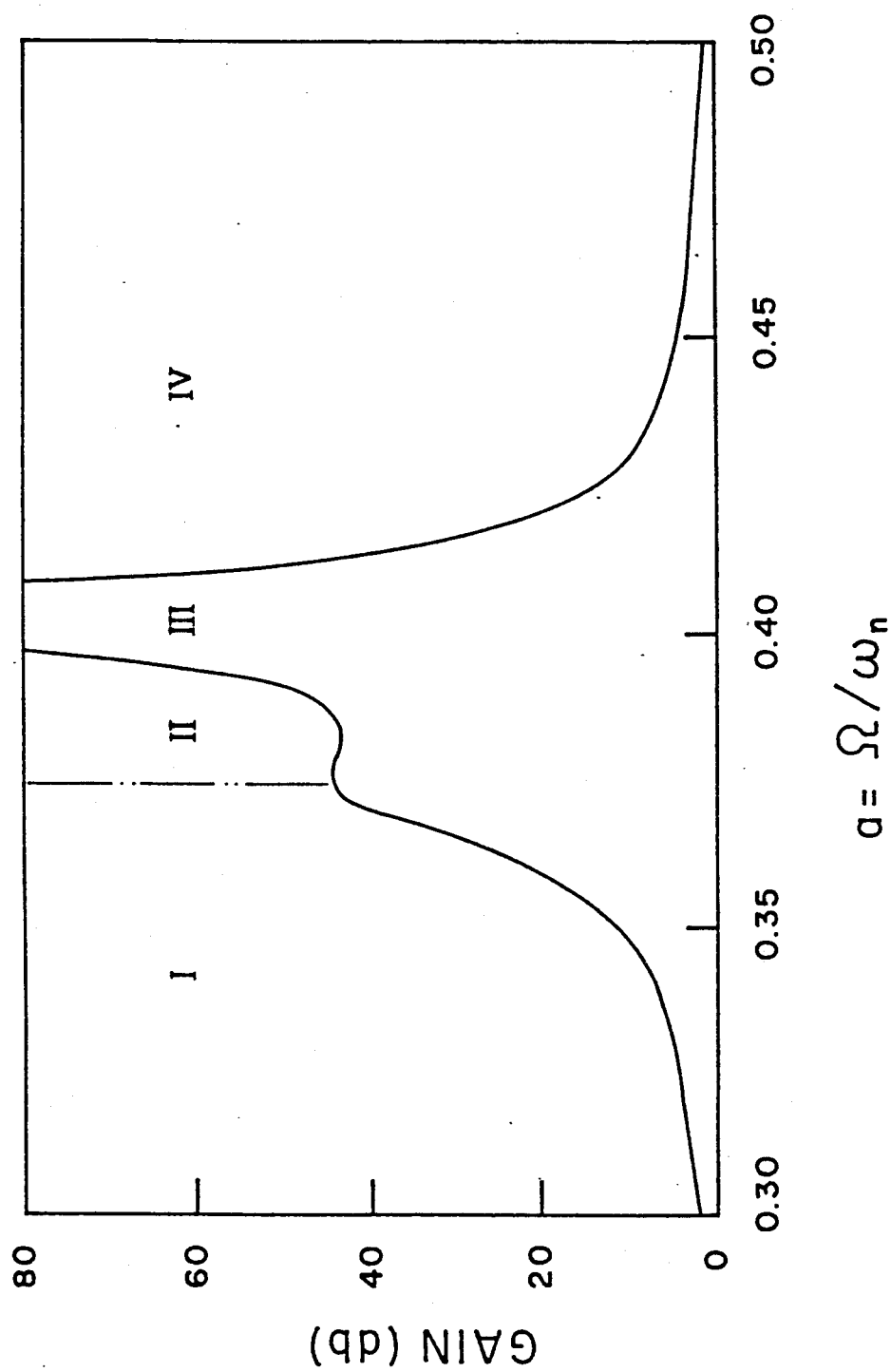
FIG. 2 shows a graph of Gain against vibration frequency for the 4 degree of freedom model shown in FIG. 1.

The response $X_2$ as a function of A (the normalized frequency of the forced vibration—Eqn. (10)) depends upon the set of parameters defined above. The general shape of the curve is as shown in FIG. 2 of the drawings. It is possible in FIG. 2 to identify four characteristic areas:
Area I—from low values of gain to a local maximum,
Area II—a local minimum having a high value of gain,
Area III—resonant condition, and
Area IV—decline from resonance.

Physically, area II represents the first frequency area of the system in the direction of the response axis, whilst area III is an area in which $y_1$ achieves very low values such that division by $y_1$ results in high values.

In order to obtain particularly high amplifications it is necessary to work in area III, but in this case even small changes in the frequency of the forced vibration have a pronounced effect on the amplification. Consequently, the preferred area of working is the area I-II. In this area, the frequency of the forced vibration has virtually no influence on the amplification.

Figure 3:
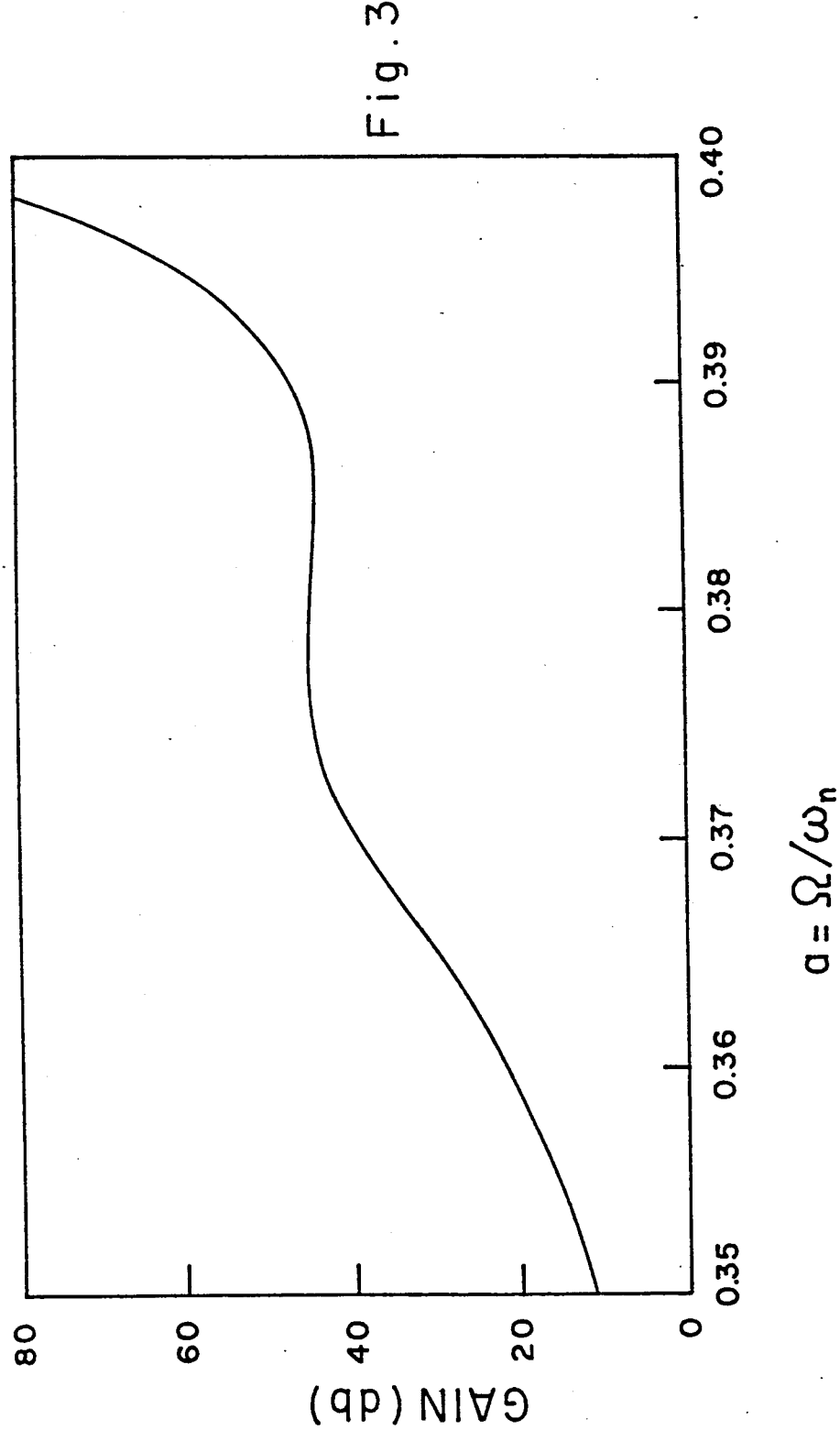
FIG. 3 is an enlarged section of FIG. 2 showing the preferred working area defining the frequency range of the forced vibration.

Referring to FIG. 3 of the drawings there is shown a graph of gain against normalized frequency of forced vibration, wherein the flat plateau represents the preferred area of operation I-II.

Consequently, the foregoing simplified analysis indicates that the four degree of freedom model may be used for determining the rate of rotation $\omega_z$ and, providing it is used within the preferred area of operation, it yields a high gain which is substantially insensitive to the frequency $\Omega$ of the forced vibration.

Figure 4:
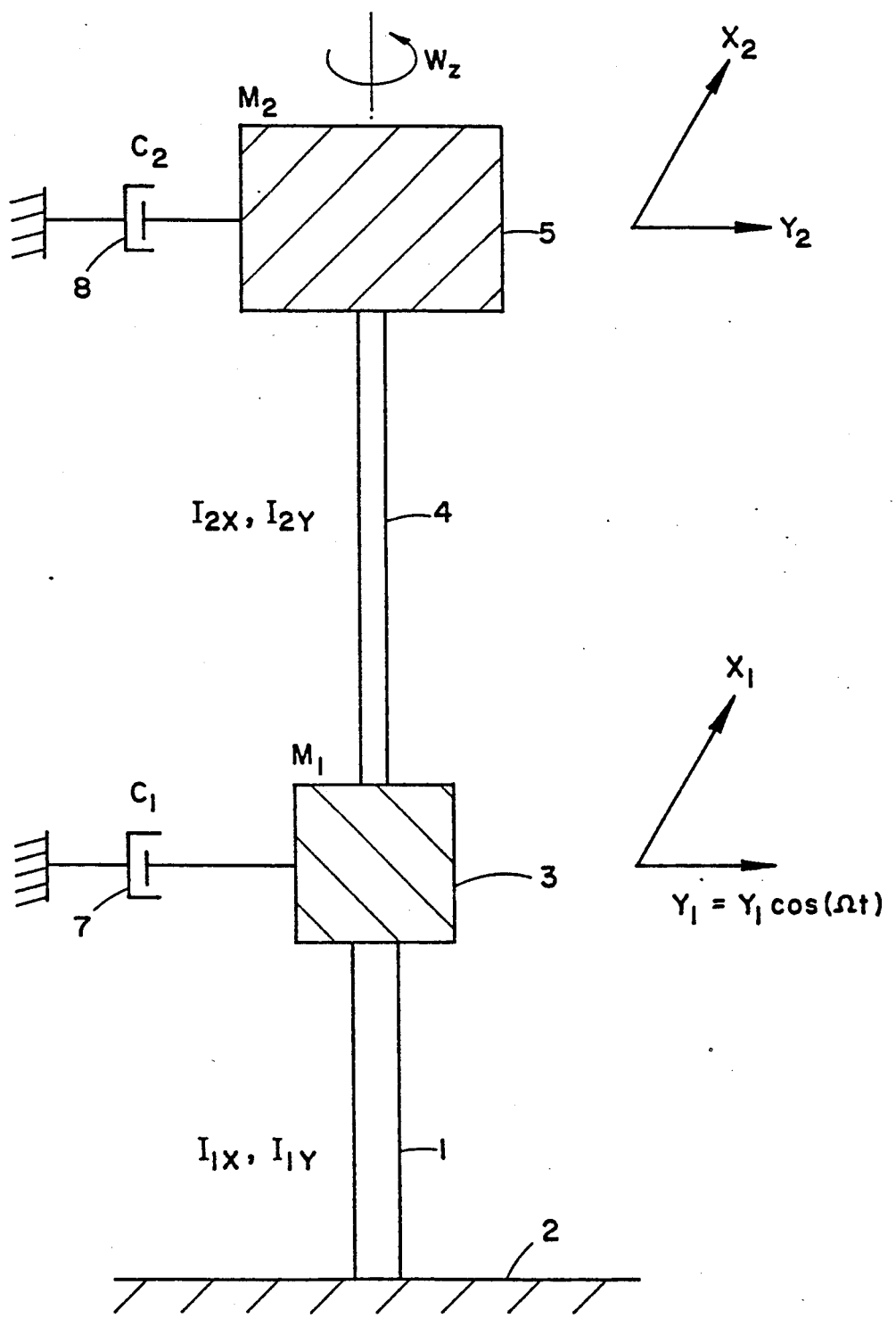
FIG. 4 shows schematically a mathematical model for a first preferred embodiment according to the invention.

In FIG. 4 there is shown schematically a mathematical model of a first embodiment of the invention. There is shown a first beam 1 having known moments of inertia $I_{1x}$ and $I_{1y}$ about mutually perpendicular transverse axes x and y, respectively, both of which are perpendicular to the longitudinal axis of the beam 1. Beam 1 is fixed at its lower end to a housing, shown schematically as 2. At its upper end, the beam 1 is coupled to a first concentrated mass element having a mass $m_1$. A second beam 4 having moments of inertia $I_{2x}$ and $I_{2y}$ about the x and y axes is coupled at its lower end to the first mass 3 and at its upper end to a second concentrated mass element having a mass $m_2$. Damper elements 7 and 8 couple the first and second masses 3 and 5 to the housing 2.

Such a system may be employed in order to determine the rate of rotation $\omega_z$ about the z-axis, parallel to the longitudinal axis of the two beams 1 and 4, by applying a forced vibration of the form $Y_1 = Y_0 \cos \Omega t$ along the y-axis and measuring the Coriolis response X along the x-axis. From a knowledge of X and $Y_0$ together with the other parameters of the system, the magnitude of $\omega_z$ may be computed as explained above.

Figure 5:
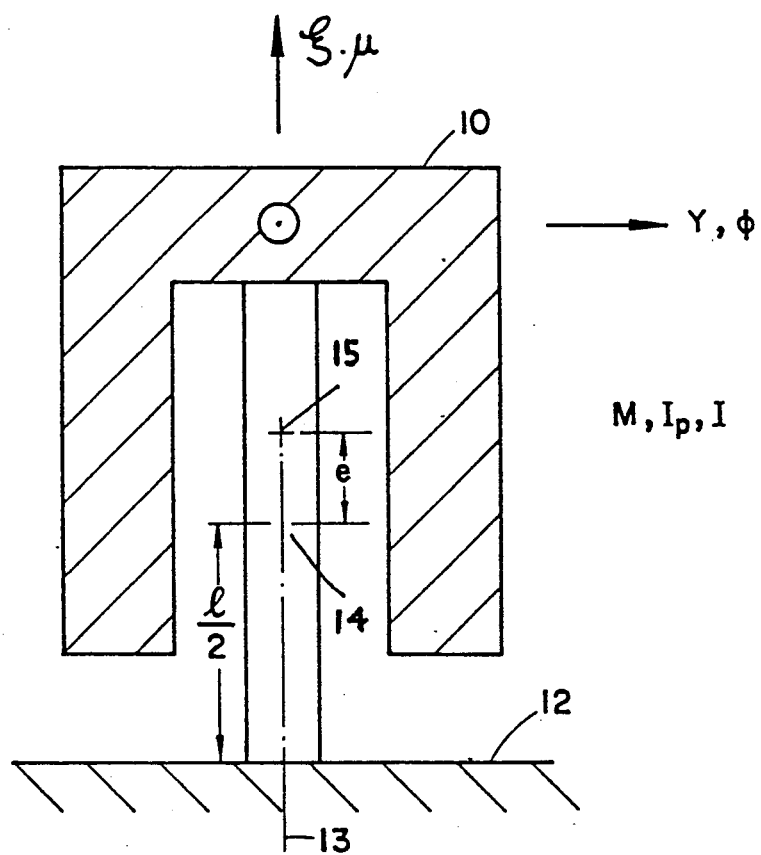
FIG. 5 shows schematically a mathematical model for a second preferred embodiment according to the invention.

Referring now to FIG. 5 there is shown an alternative mathematical model wherein, instead of using concentrated mass elements as shown in FIG. 4, there is employed an inertial mass element 10 having moments of inertia $I_{x1}$, $I_{y1}$ and $I_{z1}$ about mutually perpendicular Cartesian axes x, y and z, constituting first, second and third axes, respectively. The inertial mass element 10 is coupled to a housing 12 by means of a beam 13 having moments of inertia $I_{tx}$ and $I_{ty}$ about the x- and y-axes, respectively. Damping is provided externally by means of any suitable damping means (not shown) such as, for example, eddy current damping and so on.

Such a system has two linear and two angular degrees of freedom, making four degrees of freedom altogether. In operation, the inertial mass element 10 is subjected to a first vibration along the y-axis thereby producing a Coriolis response along the x-axis. The parameters capable of adjustment in this system include lateral rigidity of the beam, the length of the beam, the moments of inertia of the mass, the center of gravity of the mass, the frequency of the first oscillation and the damping coefficient.

The inertial mass element 10 has known moments of inertia about the x, y and z axes and two linear and two angular degrees of freedom in mutually perpendicular planes. The inertial mass element 10 is coupled to the beam 13 so as to introduce an axial displacement e between an elastic center 14 of the beam 13 and a center of gravity 15 of the mechanical system, thereby producing dynamic coupling between the linear and angular degrees of freedom of the inertial mass element 10 whereby the magnitude of the Coriolis response is substantially insensitive to frequency.

There will now be explained with reference to FIGS. 6a and 6b of the drawings a practical embodiment of the invention employing the mathematical model described above with reference to FIG. 4.

Shown in FIG. 6a is a housing 20 accommodating a first beam 21 fixed at its lower end to the housing 20. Coupled to the upper end of the first beam 21 is a first mass element 23 formed of a suitable permanent magnetic material. The first mass element 23 is coupled to a second mass element 25 by means of a second beam 26.

Provided within the housing 20 is a pair of electromagnetic drive coils 27 and 28 which are connected to a sinusoidal voltage source by means of wires 29 projecting through apertures 30 in the housing 20. Also provided within the housing 20 are pairs of horseshoe magnets 32 and 33 whose end pieces surround the ends of rods 35 and 36 connected to the first and second masses 23 and 25, respectively.

At the free end of the second mass element 25 there is provided a pickup tongue 38 which is accommodated within a recess 39 of the housing 20. Within the recess 39 there are provided optical pickups in both the x and y directions (FIGS. 6a and 6b, respectively), each optical pickup comprising a photodiode 40 and a light-emitting diode (LED) 41. The optical pickups are coupled to an electronic circuit 42 which provides a measure of the displacement of the pickup tongue 38 in the directions of the x and y axes. A signal corresponding to the measured displacement of the pickup tongue 38 in the direction of the y-axis is fed to a servo-loop which ensures that the magnitude $y_0$ of the vibration along the y-axis is maintained constant.

The horseshoe magnets 32 and 33 in combination with the metallic rods 35 and 36 constitute damping elements corresponding to those shown schematically as 7 and 8 in FIG. 4.

The system operates as follows. The housing 20 is rotated about the longitudinal z-axis at a rate of rotation $\omega_z$ whose value is required to be measured. By applying a sinusoidal voltage across the electromagnets 27 and 28, the first mass element 23, being magnetic, is displaced to and fro in the direction of the transverse y-axis. Combination of the rotation about the longitudinal z-axis and the transverse first vibration along the y-axis, results in a Coriolis response along the transverse x-axis. As a result of the Coriolis response, the pickup tongue 38 vibrates to and fro along the x-axis and the magnitude of its displacement is measured by means of the photodiode and LED 40 and 41, respectively.

The signal processing required in order to effect the measurements of the Coriolis response is not a feature of current invention and may employ well-known techniques such as described, for example, in above-mentioned U.S. Pat. No. 3,839,915.

Whilst the invention has been described with particular reference to four degree of freedom mechanical systems, it will be appreciated that the inventive concept resides in employing a mechanical resonant system having more than two degrees of freedom and, furthermore, in operating within a preferred working zone wherein the gain is substantially insensitive to the frequency of the first vibration. It will be apparent to those skilled in the art that many configurations for such mechanical resonant systems are possible.

We claim:

1. An apparatus for determining the rate of rotation of a body rotating with an angular velocity $\omega$ about a first axis, the apparatus comprising:
   a housing adapted to be fixed to said body so as to rotate with said angular velocity $\omega$ about the first axis;
   a mechanical system within the housing having more than two degrees of freedom;
   forcing means for applying a forced vibration to the mechanical system about a second axis substantially perpendicular to said first axis, thereby producing a Coriolis response along a third axis mutually perpendicular to said first and second axes, said forced vibration having a predetermined magnitude and a frequency which is constrained to lie within a predetermined range such that there is produced a coupling between said degrees of freedom whereby the magnitude of the Coriolis response is substantially insensitive to frequency;
   measuring means for measuring the magnitude of the Coriolis response; and
   computing means responsive to the magnitude of the forced vibration and to the magnitude of the Coriolis response for calculating the rate of rotation $\omega$.

2. The apparatus according to claim 1, wherein the mechanical system comprises:
   a first beam having known moments of inertia about said second and third axes and fixed at one end thereof to said housing,
   a first concentrated mass element coupled to a second end of said first beam and to a first end of a second beam having known moments of inertia about said second and third axes,
   a second concentrated mass element coupled to a second end of the second beam, and
   damping means coupled to at least one of said first and second concentrated mass elements.

3. The apparatus according to claim 1, wherein the mechanical system comprises:
   a beam having known moments of inertia about said second and third axes and fixed at one end thereof to said housing,
   an inertial mass element having known moments of inertia about said first, second and third axes and two linear and two angular degrees of freedom in mutually perpendicular planes, said mass element being coupled to the beam so as to introduce an axial displacement between an elastic center of the beam and a center of gravity of the mechanical system, thereby producing dynamic coupling between the linear and angular degrees of freedom of the inertial mass element whereby the magnitude of the Coriolis response is substantially insensitive to said frequency; and
   damping means coupled to the inertial mass element.

4. A method for determining the rate of rotation of a body rotating with an angular velocity $\omega$ about a first axis, the method comprising the steps of:
   rotating a mechanical system having more than two degrees of freedom about said first axis at said angular velocity $\omega$,
   applying a forced vibration to said mechanical system about a second axis substantially perpendicular to the first axis, said forced vibration having a magnitude and a frequency which is constrained to lie within a predetermined range such that there is produced a coupling between said degrees of freedom so as to produce a Coriolis response along a third axis mutually perpendicular to said first and second axes whose magnitude is substantially insensitive to said frequency,
   measuring the magnitude of the Coriolis response, and
   computing the rate of rotation $\omega$ as a function of the magnitude of the forced vibration and of the magnitude of the Coriolis response.

* * * * *